(12) United States Patent
Hwang

(10) Patent No.: US 6,519,398 B2
(45) Date of Patent: Feb. 11, 2003

(54) RIBBON OPTICAL FIBER CABLE AND DIE FOR COATING RIBBON OPTICAL FIBER

(75) Inventor: Joong-Jin Hwang, Kyongsangbuk-do (KR)

(73) Assignee: Samsung Electronics Co., LTD, Suwon (KR)

( * ) Notice: Subject to any disclaimer, the term of this patent is extended or adjusted under 35 U.S.C. 154(b) by 0 days.

(21) Appl. No.: 09/821,429

(22) Filed: Mar. 29, 2001

(65) Prior Publication Data

US 2002/0025128 A1 Feb. 28, 2002

(30) Foreign Application Priority Data

Aug. 30, 2000 (KR) .............................. 00-50705

(51) Int. Cl.$^7$ ................................. G02B 6/44
(52) U.S. Cl. ........................................ 385/114
(58) Field of Search .................. 385/114, 102, 385/147

(56) References Cited

U.S. PATENT DOCUMENTS 5,602,953 A * 2/1997 Delage et al. ................ 174/27
6,195,491 B1 * 2/2001 Jackson et al. ............. 385/106
6,253,013 B1 * 6/2001 Lochkovic et al. ......... 385/114

* cited by examiner

Primary Examiner—Tulsidas Patel
(74) Attorney, Agent, or Firm—Steve Cha; Cha & Reiter

(57) ABSTRACT

The inventive optical fiber ribbon includes a plurality of optical fibers horizontally arranged, upper and lower coating layers coated in upper and lower portions of the optical fibers, and side surface coating layers coated on outer surfaces of farthest optical fibers from the center of the optical fibers and having a thickness thinner than that of the upper and lower coating layers. A device of manufacturing an optical fiber ribbon is provided and includes a dye body, and a dye hole penetrating the dye body and having a cross section of a rectangular shape, characterized in that the dye hole has a height H expressed by an equation reading H=D+(0.05~0.2 mm) (wherein D represents an external diameter of said optical fiber), and a width W expressed by an equation reading W=D×N+(0~0.1 mm) (wherein N represents a number of cores of the optical fiber).

10 Claims, 3 Drawing Sheets

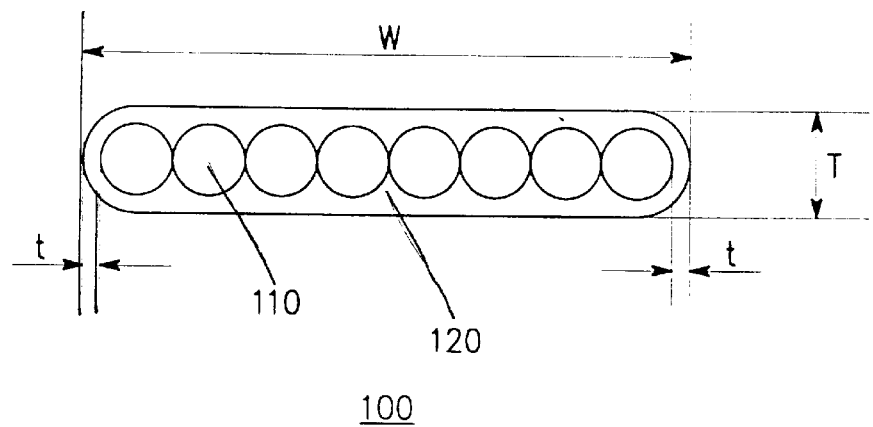
FIG. 1 [PRIOR ART]
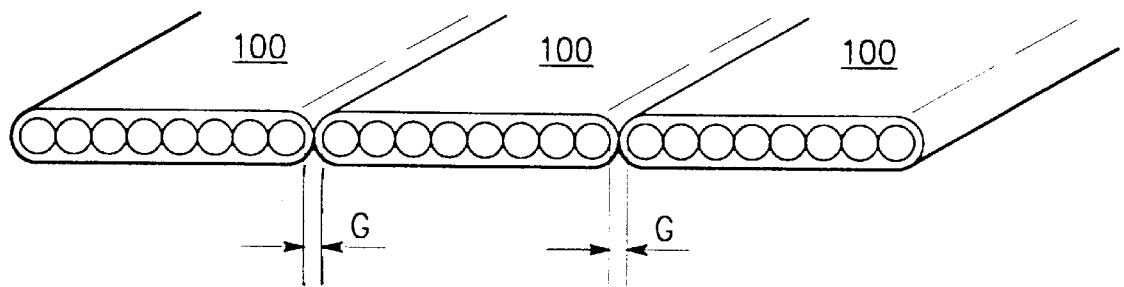
FIG. 2 [PRIOR ART]

RIBBON OPTICAL FIBER CABLE AND DIE FOR COATING RIBBON OPTICAL FIBER

CLAIM OF PRIORITY

This application claims priority to an application entitled "Ribbon Optical Fiber Cable and Die for Coating Ribbon Optical Fiber" filed with the Korean Industrial Property Office on Aug. 30, 2000 and there duly assigned Serial No. 50706.

BACKGROUND OF THE INVENTION

1. Field of the Invention

The present invention relates to an optical fiber telecommunication cables, and more particularly to optical fiber cables made of optical fiber ribbons and a manufacturing process for the same.

2. Description of the Related Art

Optical fiber cables are widely used in the telecommunications field to transmit information. In general, an optical fiber cable can be classified into a single-core optical fiber cable and a multi-core optical fiber cable depending on the number of housed optical fibers. The multi-core optical fiber can also be classified into optical fiber ribbons and loose tube optical fiber cables.

The former relying on optical fiber ribbons or multi-ribbons achieve optimum packing density in high fiber count cables by coating a plurality of optical fibers side-by-side, parallel to one another and substantially in the same plane. As the plurality of optical fibers is housed in this type of arrangement, optical-fiber ribbon cables achieve high packing density. Thus, the ribbon optical fiber cable is widely used as an optical transfer medium in an optical telecommunication system.

Referring to FIG. 1, the ribbon optical fiber cables 100 according to an embodiment of the conventional art comprise a plurality of optical fibers 110 and ribbon coating layers 120 surrounding the external peripheries of these optical fibers. The conventional ribbon optical fiber cables 100 have a thickness between 0.28 mm and 0.40 mm, and a width of 1.1 mm when the optical fibers with four cores are provided, 2.1 mm when the optical fibers with eight cores are provided, and 3.1 mm when the optical fibers with twelve cores are provided. Furthermore, the conventional ribbon optical fiber cables 100 have a coating thickness of about 30–50 μm on both side surfaces thereof.

The conventional ribbon optical fiber cables 100 described above have some drawbacks in that a gap G is generated between the outermost layers between adjacent ribbonizing layers, which envelops a plurality of fibers in a common plane, and cause problem when being connected to the optical fitting. When the gap G is great, it is difficult to connect the ribbon optical fiber cables 100 to optical fittings. Furthermore, forcing the ribbon optical fiber cables 100 into a connection to the optical fittings while having such a gap G can results in undesirable side pressure or bending load. As a consequence, a bent loss occurs in the housed optical fibers 110.

SUMMARY OF THE INVENTION

The present invention relates to a ribbon optical fiber cable, which can minimize a gap among a plurality of ribbon optical fibers when horizontally arranged in a substantially horizontal orientation, and a die unit for coating the ribbon optical fiber.

Accordingly, the present invention provides an optical fiber ribbon structure, a plurality of optical fibers arranged in a horizontal orientation; a coating layer having a upper layer and a lower coating layer covering the upper and lower portions of the optical fibers; and, outermost coating layers coated on outer surfaces of farthest optical fibers from the center of the optical fibers and having a thickness substantially thinner than the upper and lower coating layers.

The present invention provides a dye body having an opening, the dye body having a cross section in a rectangular shape, wherein the height H of the dye opening is defined according to H=D+(0.05~0.2 mm) and D represents an external diameter of the optical fiber), and wherein the width W of the dye opening is defined according to W=D×N+ (0~0.1 mm) and N represents the number of cores of the optical fiber.

BRIEF DESCRIPTION OF THE DRAWINGS

The above and other features and advantages of the present invention will become more apparent from the following detailed description when taken in conjunction with the accompanying drawings, in which:

FIG. 1 is a diagram illustrating the construction of a ribbon optical fiber cable according to an embodiment of the conventional art;

FIG. 2 is a diagram illustrating the horizontal arrangement of a plurality of ribbon optical fiber cables according to an embodiment of the conventional art;

DETAILED DESCRIPTION OF THE PREFERRED EMBODIMENT

A preferred embodiment of the present invention will now be described herein below with reference to the accompanying drawings. For the purpose of clarity, well-known functions or constructions are not described in detail as they would obscure the invention in unnecessary detail.

Figure 3:
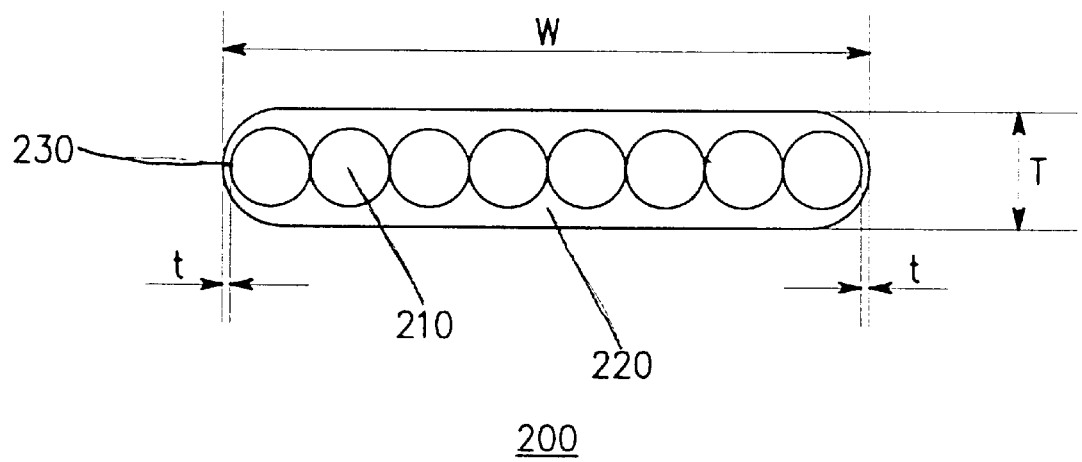
FIG. 3 is a diagram showing a ribbon optical fiber cable according to a preferred embodiment of the present invention.

FIG. 3 is a diagram illustrating an optical fiber ribbon according to a preferred embodiment of the present invention. Referring to FIG. 3, the ribbon optical fiber cable 200 comprises a plurality of optical fibers 210 arranged in a substantially horizontal orientation to form a optical fiber ribbon member; a coating comprising upper and lower coating layers 220 over the upper and lower portions of the optical fibers 210; and, side outermost surface coating layers 230 defining the adjacent end fibers (hinge section) of the ribbon member with a thickness that is thinner than the upper and lower coating layers 220.

The planar array of optical fibers 210, to which an optical signal is directly transferred, includes a core, a clad, and a buffer layer. If desired, different colors may be dyed on the buffer layer in order to distinguish optical fibers during the connection or repair process.

The upper and lower coating layers 220 and the side surface coating layers 230 are composed of a coating material, which is formed from an ultraviolet light curable material such as urethane acrylate. This ultra-violate curable material form a coating layer over the optical fiber ribbon member is hardened through a radically polymerized reaction when exposed to an ultra-violate layer.

The adjacent ends (hinge section) of the coating layer 230 have a thickness lower than 10 $\mu$m. One end of the adjacent ends of the coating layer 230 becomes in contact with another adjacent coating layer of optical fiber ribbons. Thus, the adjacent end fibers of each ribbon member are spaced apart by a gap, G, as shown in FIG. 4.

Figure 4:
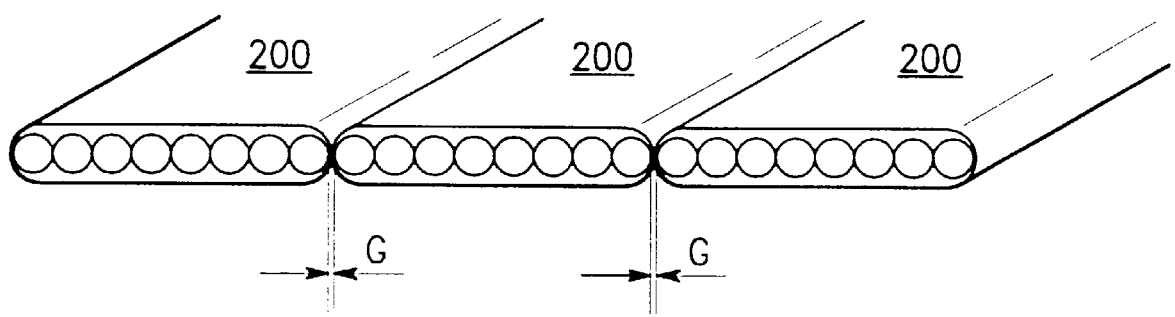
FIG. 4 is a diagram showing the horizontal arrangement of a plurality of ribbon optical fiber cables according to a preferred embodiment of the present invention.

FIG. 4 is a diagram illustrating the horizontal arrangement of a plurality of optical fiber ribbons according to the preferred embodiment of the present invention. Referring to FIG. 4, the optical fiber ribbon according to the preferred embodiment of the present invention has very small gaps between the adjacent end fibers of each ribbon member. Each adjacent end (hinge section) is configured to have a thickness less than 10 $\mu$m. Accordingly, a gap, G, between adjacent ends (hinge sections) of the adjacent end fibers would be less than 20 $\mu$m. Hence, the reduced gap between adjacent optical fiber ribbons provides an easier connection to the optical fitting, such as an optical connector or a fiber block, and also prevents a bending load when connecting the planar array of optical fiber ribbons to the optical fittings, thereby avoiding a bending loss of the optical fibers housed inside thereof.

Figure 5:
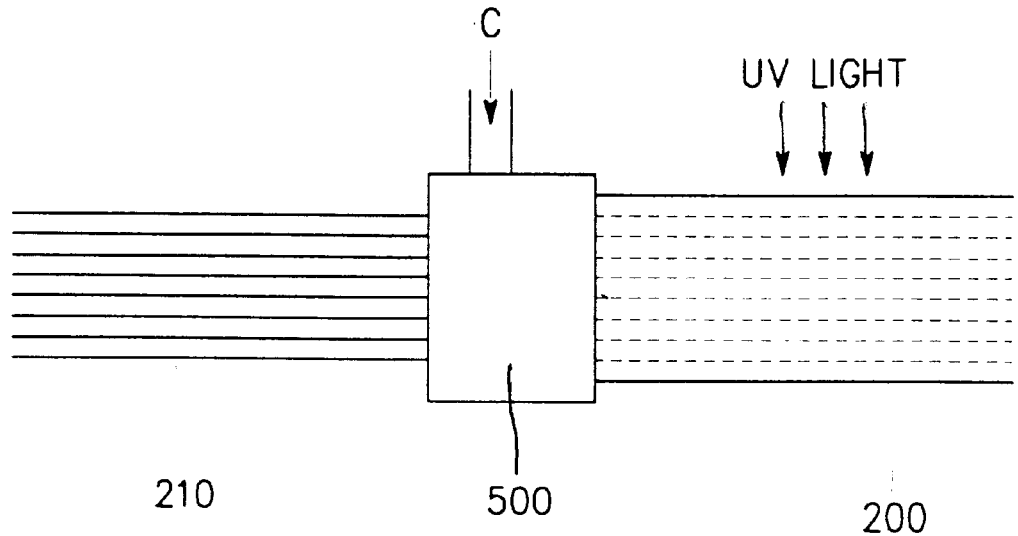
FIG. 5 is a schematic diagram showing the process of manufacturing the ribbon optical fiber cable according to a preferred embodiment of the present invention; and, FIG. 6 is a perspective view of the inventive die for coating the ribbon optical fiber according to a preferred embodiment of the present invention.
Figure 6:
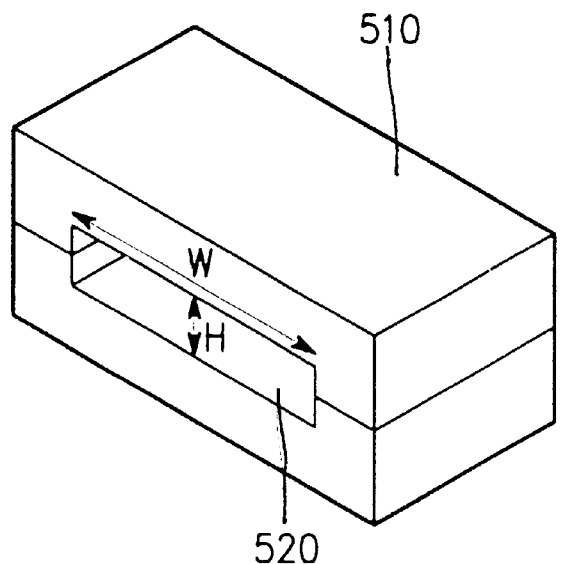

FIG. 5 is a schematic diagram illustrating the process of manufacturing an optical fiber ribbon member according to a preferred embodiment of the present invention. FIG. 6 is a perspective view of a die element 500 for coating an optical fiber ribbon member according to a preferred embodiment of the present invention.

Referring to FIG. 5, the planar array of optical fibers 210 dyed in different colors and wound on a spool (not shown) passes through a guiding comb (not shown). The coating material C of an ultra-violet curable material is supplied to coat the external peripheries of the planar array of optical fibers 210. The upper and lower coating layers as well as adjacent coating layers (hinge section) are formed as a result of hardening by an ultra-violate layer of the coating material C. As a result, a ribbon optical fiber ribbon member 200 is manufactured. As shown in FIG. 6, the dye element 500 for coating optical fiber ribbons includes a dye body 510 with a dye hole 520. The dye body 510 contains separable upper and lower plates, and a supply path (not shown) through which the coating material of an ultra-violate hardening type is supplied. The dye hole 520 has a cross section of a rectangular shape. In particular, the dye hole 520 has a height and a width defined by the Equations 1 and 2 below:

$$H=D+(0.05\sim 0.2 \text{ mm}) \quad (1),$$

where D represents an external diameter of the optical fiber; and, $$W=D\times N+(0\sim 0.1 \text{ mm}) \quad (2),$$

where, N represents a number of cores of the optical fiber.

As shown in above Equations 1 and 2, the dye member 500 for coating optical fiber ribbons according to the preferred embodiment of the present invention has a greater width of 0.1 mm than multiplication of external diameter of the optical fiber by a number of cores of the optical fiber. Thus, the thickness of the coating material of an ultra-violate layer hardening type, which is coated on the external surface of the farthest optical fibers passing through the dye hole 520, becomes thinner. Hence, the thickness of the adjacent coating surface of the optical fiber ribbon cable manufactured after being exposed to the ultra-violate layer also thinner.

As described above, the ribbon optical fiber cable and the dye member for coating optical fiber ribbons members according to an embodiment of the present invention provide an advantage of providing an easier connection to optical fittings, such as an optical connector or a fiber block, owing to a reduction of the gap size between the optical fiber ribbon members. In addition, the connection of the horizontally arranged optical fiber ribbons to the optical fittings does not result in a bending load, thereby reducing the bending loss of the optical fibers housed therein.

What is claimed is:

1. An optical fiber ribbon structure, comprising:
   a plurality of optical fibers arranged in a horizontal orientation;
   a coating having an upper coating layer and a lower coating layer covering the upper and lower portions of said plurality of optical fibers and outermost coating layers coated on remaining outer surfaces of farthest optical fibers from the center of said plurality of optical fibers and having a substantially uniform thickness that is substantially thinner than said upper and lower coating layers.

2. The optical fiber ribbon of claim 1, wherein said outermost coating layers has a thickness less than 10 $\mu$m.

3. The optical fiber ribbon of claim 1, wherein said upper and lower coating layers and said outermost surface coating layers are composed of an ultra-violet curable material.

4. The optical fiber ribbon of claim 1, wherein the plurality of said optical fibers are spaced from each other such that their respective outermost coating layers are at a predetermined distance from each other.

5. The optical fiber ribbon of claim 1, wherein said optical fibers in said ribbon are spaced apart uniformly inside said ribbon structure.

6. An optical fiber ribbon structure, comprising:
   a first optical fiber ribbon member further comprising:
      a first plurality of optical fibers arranged in a horizontal orientation;
      a first coating covering the plurality of said first optical fibers with an ultraviolet light curable material, wherein outermost coating layer coated on the outer surfaces of said first optical fibers having a substantially uniform thickness that is substantially thinner than the upper and lower layers of said first coating, wherein said upper and lower layers are in the horizontal orientation of the first plurality of optical fibers; and,
   a second optical fiber ribbon member arranged adjacent to said first optical fiber ribbon member in said horizontal orientation, wherein a gap is generated between the adjacent first and second ribbons, said second optical fiber ribbon member further comprising further comprising:
      a second plurality of optical fibers arranged in a horizontal orientation;
      a second coating covering the plurality of said second optical fibers with an ultraviolet light curable material, wherein outermost coating layer coated on the outer surfaces of said second optical fibers having a substantially uniform thickness that is substantially thinner than the upper and lower layers of said second coating, wherein said upper and lower layers are in the horizontal orientation of second plurality of optical fibers.

7. The optical fiber ribbon of claim 6, wherein said upper and lower coating layers and said outermost surface coating layers are composed of an ultra-violate curable material.

8. The optical fiber ribbon of claim 6, wherein the pluralities of said optical fibers are spaced from each other such that their respective outermost coating layers are at a predetermined distance from each other.

9. The optical fiber ribbon of claim 6, wherein said optical fibers in said ribbon are spaced apart uniformly inside said ribbon structure.

10. The optical fiber ribbon of claim 6, wherein said outermost coating layers has a thickness less than 10 $\mu$m.

* * * * *